(12) United States Patent
Wang et al.

(10) Patent No.: US 8,279,501 B2
(45) Date of Patent: Oct. 2, 2012

(54) SCANNING APPARATUS

(75) Inventors: Ching-Chung Wang, Taipei (TW); Chien-Kuo Kuan, Taipei (TW)

(73) Assignee: Primax Electronics Ltd., Taipei (TW)

( * ) Notice: Subject to any disclaimer, the term of this patent is extended or adjusted under 35 U.S.C. 154(b) by 387 days.

(21) Appl. No.: 12/777,931

(22) Filed: May 11, 2010

(65) Prior Publication Data

US 2011/0181923 A1     Jul. 28, 2011

(30) Foreign Application Priority Data

Jan. 22, 2010 (TW) ................................ 99101754 A

(51) Int. Cl.
    *H04N 1/04* (2006.01)
(52) U.S. Cl. ......... 358/475; 358/474; 358/488; 358/487
(58) Field of Classification Search .................. 358/475, 358/474, 488, 487, 505
See application file for complete search history.

(56) References Cited

U.S. PATENT DOCUMENTS

| 5,710,643 | A | * | 1/1998 | Depiano | ....................... | 358/487 |
| 7,715,063 | B2 | * | 5/2010 | Proctor | ......................... | 358/474 |

* cited by examiner

*Primary Examiner* — Houshang Safaipour
(74) *Attorney, Agent, or Firm* — Kirton McConkie; Evan R. Witt

(57) ABSTRACT

A scanning apparatus includes a scanning module. The scanning module includes plural light emitting diodes, a porous reflective plate with plural openings, and a reflective element. When the scanning apparatus starts scanning a document, the light beams emitted by the light emitting diodes are directed to the porous reflective plate. A portion of light beams reflected by the porous reflective plate are defined as reflected light beams. The light beams penetrating through the openings are diffracted to be diffractive penetrated light beams. The reflected light beams reflected by the reflective element and the diffractive penetrated light beams are projected on the document, so that enhanced uniform illumination efficacy is achieved.

9 Claims, 3 Drawing Sheets

SCANNING APPARATUS

FIELD OF THE INVENTION

The present invention relates to a scanning apparatus, and more particularly to a scanning apparatus for scanning a document.

BACKGROUND OF THE INVENTION

Scanning apparatuses are widely used for scanning images of documents. The scanned images can be converted into electronic files, which are then stored, processed or spread. With increasing development of scanning technologies, the scanning apparatuses have experienced great growth and are now rapidly gaining in popularity.

FIG. 1 is a schematic perspective view illustrating a conventional scanning apparatus. As shown in FIG. 1, the conventional scanning apparatus 1 comprises a lower casing 10 and an upper cover 11. The lower casing 10 comprises a glass platform 101 and a scanning module 102. A document P to be scanned is placed on the glass platform 101. After the document P is placed on the glass platform 101, the lower casing 10 is covered by the upper cover 11, so that the document P is positioned in the scanning apparatus 1. During the scanning operation is done, the scanning module 102 is moved within the lower casing 10 to scan the document P.

FIG. 2 is a schematic cross-sectional view illustrating the conventional scanning apparatus. Hereinafter, the internal structure of the lower casing 10 of the conventional scanning apparatus 1 will be illustrated with reference to FIG. 2.

As shown in FIG. 2, in addition to the glass platform 101 and the scanning module 102, the lower casing 10 further comprises a transmission shaft 103 and a driving motor 104. The scanning module 102 is installed on the transmission shaft 103. The driving motor 104 is connected with the scanning module 102 for providing motive power to the scanning module 102, so that the scanning module 102 is moved along the transmission shaft 103. The scanning module 102 comprises a light source 1021, a fixed reflective mirror 1022, a lens 1023 and an optical sensing element 1024. The light source 1021 is a lamp tube. The incident light beams L emitted by the light source 1021 are projected on the document P. The incident light beams L reflected by the document P are then reflected by the fixed reflective mirror 1022, and focused by the lens 1023. The focused incident light beams L are received by the optical sensing element 1024, and then converted into corresponding image signals of the document P.

Hereinafter, a process for performing a scanning operation by the scanning apparatus 1 will be illustrated with reference to FIGS. 1 and 2. For scanning the document P by the scanning apparatus 1, the document P is firstly placed on the glass platform 101 of the lower casing 10. Then, the upper cover 11 is rotated toward the lower casing 10 to cover the lower casing 10 and fix the document P. After the document P is positioned in the scanning apparatus 1, the scanning apparatus 1 is activated, and a scanning operation for scanning the document P starts. The incident light beams L emitted by the light source 1021 are projected on the document P. The incident light beams L reflected by the document P are then reflected by the fixed reflective mirror 1022, and focused by the lens 1023. The focused incident light beams L are received by the optical sensing element 1024, and thus a first portion of the image of the document P is acquired. Moreover, when the scanning apparatus 1 is activated, the driving motor 104 is enabled to drive movement of the scanning module 102 along the transmission shaft 103. That is, the overall document P is scanned while moving the scanning module 102 along the transmission shaft 103. After the scanning operation is finished, the complete image of the document P is acquired.

However, the conventional scanning apparatus 1 still has some drawbacks. For example, if the incident light beams L emitted by the light source 1021 are not uniformly projected on the document P, the scanning quality of the scanning module 102 is deteriorated.

Therefore, there is a need of providing an improved scanning apparatus with enhanced scanning quality.

SUMMARY OF THE INVENTION

An object of the present invention provides a scanning apparatus for generating uniform light beams and projecting the uniform light beams on the document.

Another object of the present invention provides a scanning apparatus with enhanced scanning quality.

In accordance with an aspect of the present invention, there is provided a scanning apparatus for scanning a document to acquire a document image. The scanning apparatus includes a glass platform and a scanning module. The document is placed on the glass platform. The scanning module is used for scanning the document to acquire the document image. The scanning module includes plural light emitting diodes, a porous reflective plate and a reflective element. The plural light emitting diodes emit light beams. The porous reflective plate is arranged beside the plural light emitting diodes, and includes plural first openings and plural second openings. Each first opening and each second opening are arranged at locations relevant to a corresponding light emitting diode. The second opening is arranged beside the first opening. The first opening is smaller than the second opening. The light beams that have penetrated through the plural first openings and the plural second openings are defined as penetrated light beams. The light beams unable to penetrate through the plural first openings and the plural second openings are reflected by the porous reflective plate and defined as reflected light beams. The reflective element is used for receiving and reflecting the reflected light beams from the porous reflective plate, so that the reflected light beams reflected by the reflective element are projected on the document. The penetrated light beams are diffracted by the first openings and the second openings so as to be uniformly projected on the document.

In an embodiment, the first opening has a first diameter, the second opening has a second diameter, the first opening and the second opening are circular, and the first diameter is smaller than the second diameter.

In an embodiment, the plural light emitting diodes are arranged in a line, and the porous reflective plate is substantially an elongated stripe-like plate.

In an embodiment, the scanning apparatus further includes a transmission mechanism. The transmission mechanism is connected with the scanning module for providing motive power to the scanning module, so that the scanning module is moved along the glass platform.

In an embodiment, the scanning module further includes a fixed reflective mirror, a lens and an optical sensing element. The penetrated light beams and the reflected light beams projected on the document are reflected by the document to produce combined reflected light beams. The combined reflected light beams are received and reflected by the fixed reflective mirror. The lens for focusing the combined reflected light beams that are reflected by the fixed reflective mirror. The optical sensing element is used for receiving the combined reflected light beams, thereby acquiring the document image.

In an embodiment, the optical sensing element is a charge coupled device (CCD).

In an embodiment, the reflective element is a reflective mirror.

In an embodiment, the scanning apparatus further includes an upper cover for covering the document that is placed on the glass platform.

In an embodiment, the scanning apparatus further includes an automatic feeder for feeding the document and a second document, thereby facilitating the scanning apparatus to perform a duplex scanning operation or successively scan the document and the second document.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
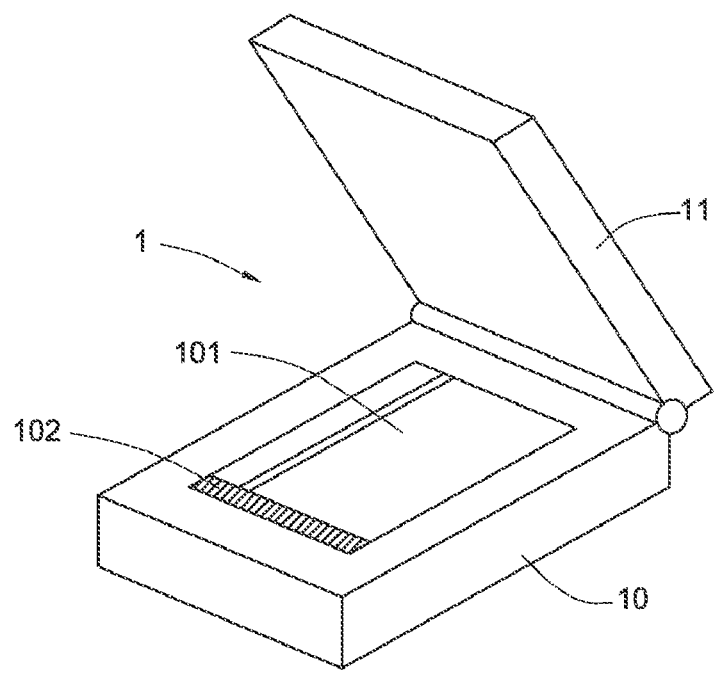
FIG. 1 is a schematic perspective view illustrating a conventional scanning apparatus.
Figure 2:
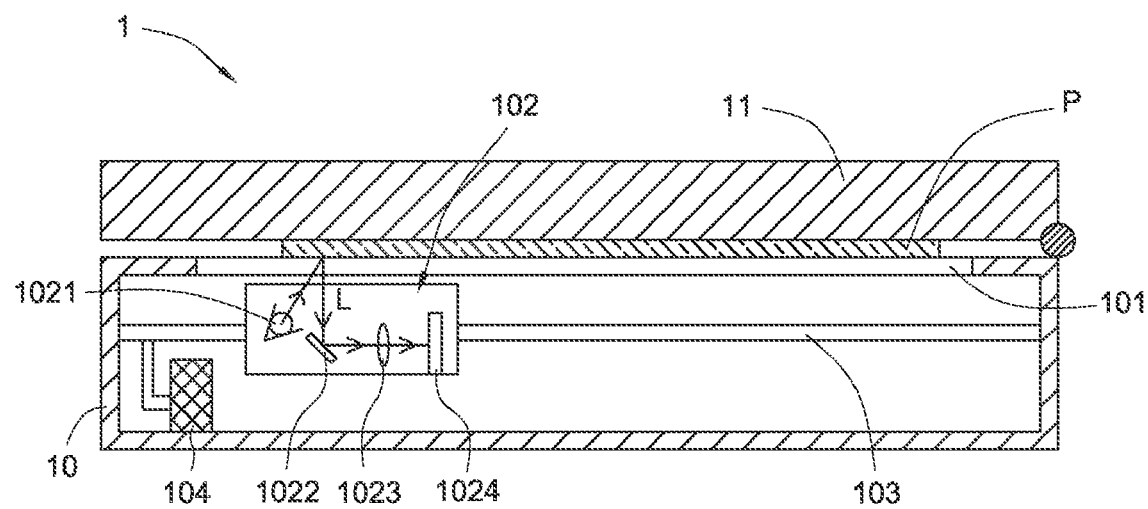
FIG. 2 is a schematic cross-sectional view illustrating the conventional scanning apparatus.
Figure 3:
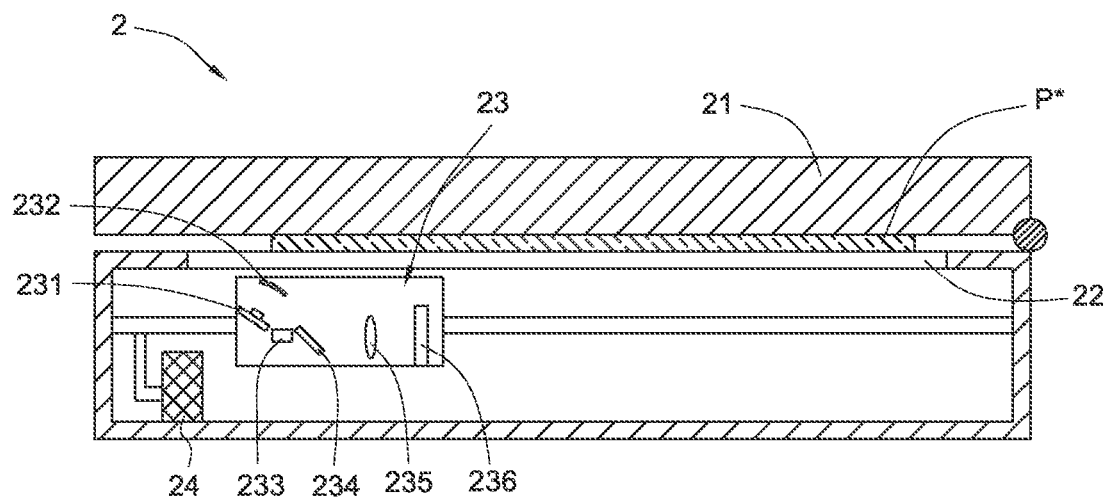
FIG. 3 is a schematic cross-sectional view illustrating a scanning apparatus according to an embodiment of the present invention.

FIG. 3 is a schematic cross-sectional view illustrating a scanning apparatus according to an embodiment of the present invention. As shown in FIG. 3, the scanning apparatus 2 comprises an upper cover 21, a glass platform 22, a scanning module 23 and a transmission mechanism 24. The scanning module 23 is used for scanning a document P*, thereby acquiring a document image. After the document P* is placed on the glass platform 22, the document P* could be scanned by the scanning module 23. The upper cover 21 is used for covering the document P* that is placed on the glass platform 22. The transmission mechanism 24 is connected with the scanning module 23 for providing motive power to the scanning module 23, so that the scanning module 23 is moved along the glass platform 22. The scanning module 23 comprises plural light emitting diodes 231 (see also FIG. 5), a porous reflective plate 232, a reflective element 233, a fixed reflective mirror 234, a lens 235 and an optical sensing element 236.

Figure 4:
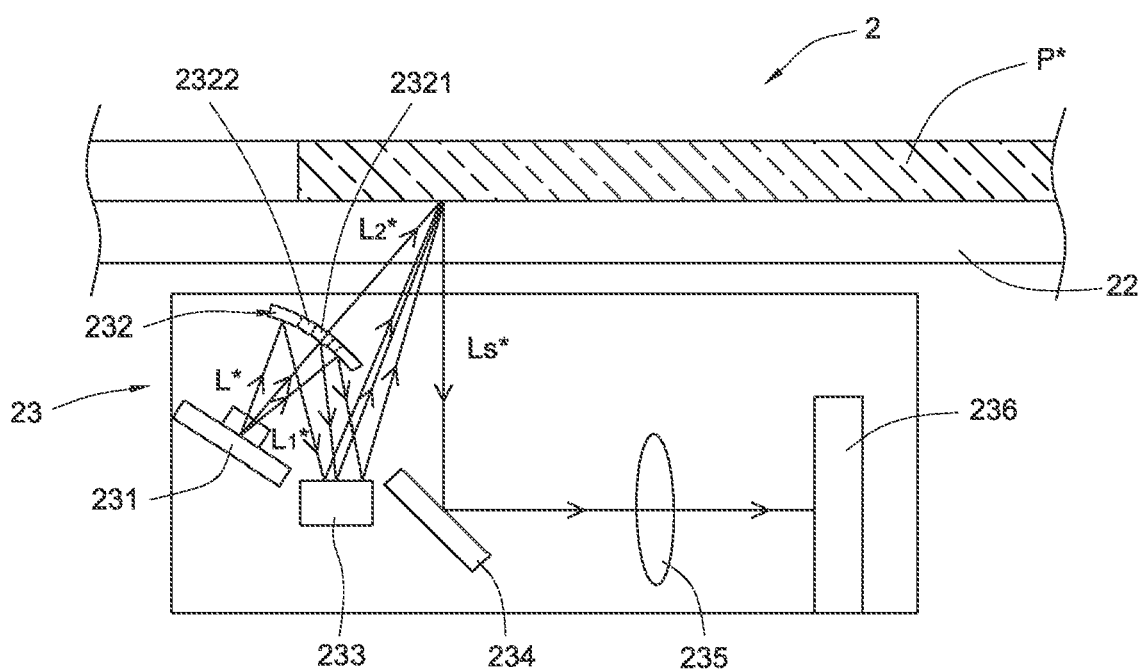
FIG. 4 is a schematic side view illustrating the scanning module of the scanning apparatus according to an embodiment of the present invention.
Figure 5:
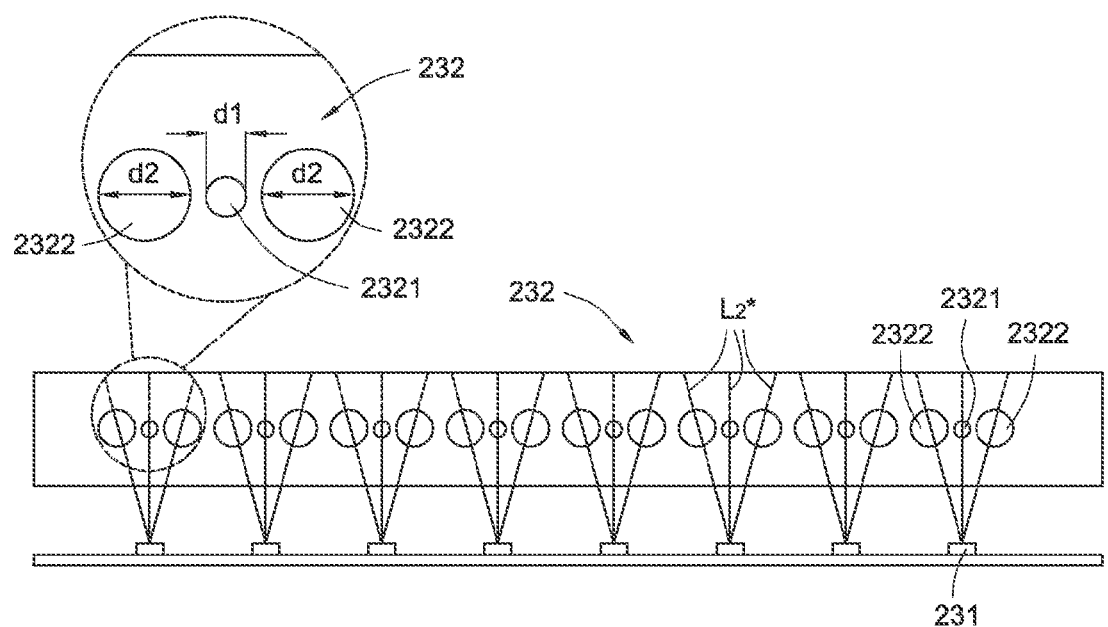
FIG. 5 is a schematic side view illustrating the relation between the plural light emitting diodes and the porous reflective plate according to an embodiment of the present invention.

FIG. 4 is a schematic side view illustrating the scanning module of the scanning apparatus according to an embodiment of the present invention. FIG. 5 is a schematic side view illustrating the relation between the plural light emitting diodes and the porous reflective plate according to an embodiment of the present invention. Hereinafter, the configurations and the operating principles of the scanning module 23 will be illustrated with reference to FIGS. 4 and 5. All of the plural light emitting diodes 231 are used for emitting light beams.

The porous reflective plate 232 is arranged beside the plural light emitting diodes 231. The porous reflective plate 232 comprises plural first openings 2321 and plural second openings 2322. Each first opening 2321 and each second opening 2322 are arranged at locations relevant to a corresponding light emitting diode 231. The second opening 2322 is arranged beside the first opening 2321. The first opening 2321 is smaller than the second opening 2322. The reflective element 233 and the fixed reflective mirror 234 are used for receiving and reflecting light beams. The light beams reflected by the fixed reflective mirror 234 are then focused by the lens 235. The focused light beams are received by the optical sensing element 236, thereby generating a corresponding document image.

In this embodiment, the plural light emitting diodes 231 are arranged in a line. Since the arrangement of the porous reflective plate 232 is in coordination with the plural light emitting diodes 231, the porous reflective plate 232 is substantially an elongated stripe-like plate. In the porous reflective plate 232, the first opening 2321 has a first diameter d1, and the second opening 2322 has a second diameter d2. The first opening 2321 and the second opening 2322 are circular. In this embodiment, the first diameter d1 is smaller than the second diameter d2. An example of the reflective element 233 is a reflective mirror. In addition, an example of the optical sensing element 236 is a charge coupled device (CCD).

For scanning the document P* by the scanning apparatus 2, the document P* is firstly placed on the glass platform 22. Then, the upper cover 21 is rotated to cover and fix the document P*. After the document P* is positioned in the scanning apparatus 2, the scanning apparatus 2 is activated, and the scanning apparatus 2 starts scanning the document P*. The light beams L* emitted by all of the plural light emitting diodes 231 are directed to the porous reflective plate 232. A portion of the light beams L* are reflected by the porous reflective plate 232 and defined as reflected light beams L1*. The reflected light beams L1* are received and reflected by the reflective element 233. As such, the reflected light beams L1* are uniformly penetrated through the glass platform 22 and uniformly projected on the document P*. On the other hand, a portion of the light beams L* are not reflected by the porous reflective plate 232 but penetrated through the first openings 2311 and the second opening 2322. During the light beams L* are penetrated through the first openings 2311 and the second opening 2322, the light beams L* are diffracted by the first openings 2311 and the second openings 2322 to result in diffractive penetrated light beams L2*. As such, the diffractive penetrated light beams L2* are uniformly projected on the document P* through the glass platform 22. The reflected light beams L1* and the penetrated light beams L2* that are projected on the document P* are then reflected by the document P*, and thus combined reflected light beams Ls* are produced. The combined reflected light beams Ls* are directed to the fixed reflective mirror 234 and reflected by the fixed reflective mirror 234. As such, the combined reflected light beams Ls* are directed to the lens 235 and focused by the lens 235. The focused combined reflected light beams Ls* are received by the optical sensing element 236, and thus the document image is acquired. Then, the scanning module 23 is moved by the transmission mechanism 24, so that the scanning module 23 is moved along the glass platform 21 to scan the whole document P*. After the scanning operation of the scanning module 23 is finished, the complete image of the document P* is acquired. In an embodiment, the scanning apparatus 2 is a flatbed image scanner.

For enhancing the scanning quality, the light beams L* emitted by the plural light emitting diodes 231 need to be uniformly projected on the document P*. Since the porous reflective plate 232 has openings, the light beams L* are diffracted by the openings to result in diffractive penetrated light beams L2*. The diffractive penetrated light beams L2* can be uniformly projected on the document P* in order to enhance the scanning quality. Generally, the intensity of the light beams emitted by the middle portion of the light emitting diode 231 is relatively stronger, but the intensity of the light beams emitted by the lateral portion of the light emitting diode 231 is relatively weaker. Since the light beams emitted by the middle portion of the light emitting diode 231 are penetrated through the first opening 2321 and the light beams emitted by the lateral portion of the light emitting diode 231 are penetrated through the second opening 2322, the second opening 2322 is designed to be larger than the first opening 2321. According to the specific design of the present invention, the stronger-intensity light beams penetrative through the porous reflective plate 232 are less than the weaker-intensity light beams penetrative through the porous reflective plate 232. In this situation, the light beams projected on the document P* are homogenized and thus the scanning quality is enhanced.

On the other hand, most of the light beams emitted by the light emitting diodes 231 are reflected by the porous reflective plate 232 and the reflective element 233 to produce the reflected light beams L1*, which are then projected on the document P*. Since the reflected light beams L1* contain a great amount of light beams, the reflected light beams L1* contribute very high brightness. Moreover, after being reflected by the porous reflective plate 232 and the reflective element 233, the reflected light beams L1* become more uniform. In other words, the light beams projected on the document P* will result in high brightness and uniform illumination efficacy so as to enhance the scanning quality.

Figure 6:
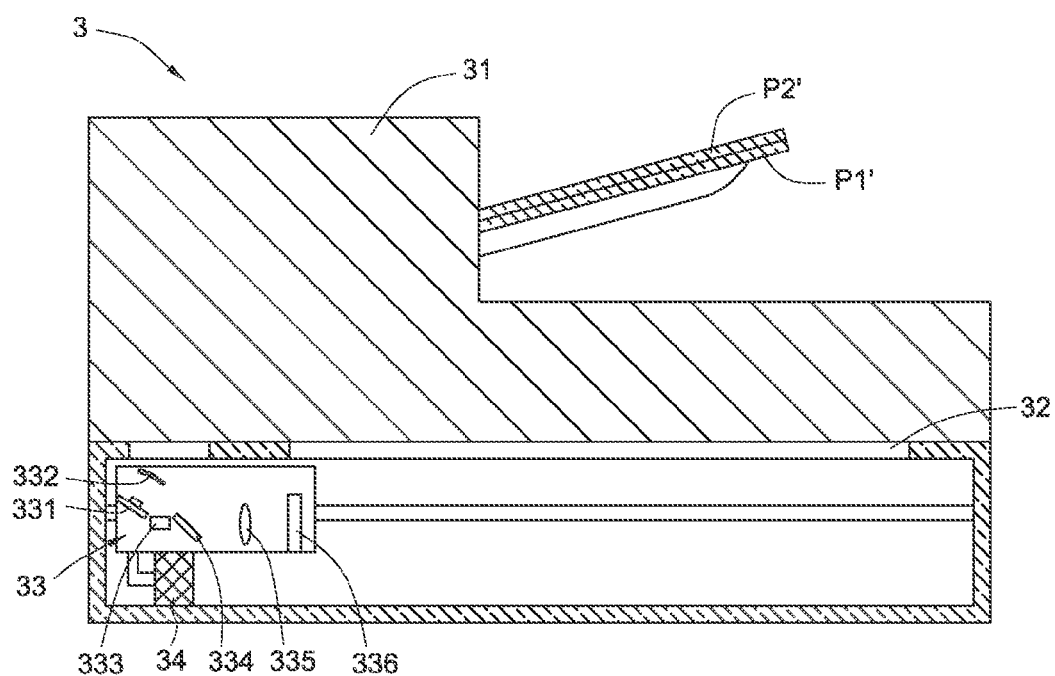
FIG. 6 is a schematic cross-sectional view illustrating a scanning apparatus according to another embodiment of the present invention.

FIG. 6 is a schematic cross-sectional view illustrating a scanning apparatus according to another embodiment of the present invention. As shown in FIG. 6, the scanning apparatus 3 comprises an automatic document feeder 31, a glass platform 32, a scanning module 33 and a transmission mechanism 34. The automatic document feeder 31 is disposed on the glass platform 32 for feeding plural documents. For clarification, only two documents P1' and P2' are shown in the drawings. By means of the automatic document feeder 31, the scanning apparatus 3 could perform a duplex scanning operation, or the successively scan the documents P1' and P2'. Alternatively, the scanning apparatus 3 may perform a single-side scanning operation, which is usually performed by a general flatbed image scanner. The scanning module 33 comprises plural light emitting diodes 331 (see also FIG. 5), a porous reflective plate 332, a reflective element 333, a fixed reflective mirror 334, a lens 335 and an optical sensing element 336. Except for the automatic document feeder 31, the configurations and the operating principles of other components included in FIG. 6 are similar to those illustrated in the first embodiment, and are not redundantly described herein.

From the above description, the scanning module of the canning apparatus of the present invention includes a porous reflective plate. Before the light beams generated by the light emitting diodes are projected on the document, a portion of the light beams are penetrated through the openings of the porous reflective plate to produce diffractive penetrated light beams, and a portion of the light beams are reflected by the porous reflective plate to produce reflected light beams. The diffractive penetrated light beams and the reflected light beams can be uniformly projected on the document, so that the scanning quality is enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A scanning apparatus for scanning a document to acquire a document image, said scanning apparatus comprising:
   a glass platform for placing said document; and
   a scanning module for scanning said document to acquire said document image, said scanning module comprising:
      plural light emitting diodes for emitting light beams;
      a porous reflective plate arranged beside said plural light emitting diodes, and comprising plural first openings and plural second openings, wherein each first opening and each second opening are arranged at locations relevant to a corresponding light emitting diode, said second opening is arranged beside said first opening, and said first opening is smaller than said second opening, wherein said light beams penetrated through said plural first openings and said plural second openings are defined as penetrated light beams, and said light beams unable to penetrate through said plural first openings and said plural second openings are reflected by said porous reflective plate and defined as reflected light beams; and
      a reflective element for receiving and reflecting said reflected light beams from said porous reflective plate, so that said reflected light beams reflected by said reflective element are projected on said document, wherein said penetrated light beams are diffracted by said first openings and said second openings so as to be uniformly projected on said document.

2. The scanning apparatus according to claim 1 wherein said first opening has a first diameter, said second opening has a second diameter, said first opening and said second opening are circular, and said first diameter is smaller than said second diameter.

3. The scanning apparatus according to claim 1 wherein said plural light emitting diodes are arranged in a line, and said porous reflective plate is substantially an elongated stripe-like plate.

4. The scanning apparatus according to claim 1 further comprising a transmission mechanism, which is connected with said scanning module for providing motive power to said scanning module, so that said scanning module is moved along said glass platform.

5. The scanning apparatus according to claim 1 wherein said scanning module further comprises:
   a fixed reflective mirror, wherein said penetrated light beams and said reflected light beams projected on said document are reflected by said document to produce combined reflected light beams, and said combined reflected light beams are received and reflected by said fixed reflective mirror;
   a lens for focusing said combined reflected light beams that are reflected by said fixed reflective mirror; and
   an optical sensing element for receiving said combined reflected light beams, thereby acquiring said document image.

6. The scanning apparatus according to claim 5 wherein said optical sensing element is a charge coupled device (CCD).

7. The scanning apparatus according to claim 1 wherein said reflective element is a reflective mirror.

8. The scanning apparatus according to claim 1 further comprising an upper cover for covering said document that is placed on said glass platform.

9. The scanning apparatus according to claim 1 wherein said scanning apparatus further comprises an automatic feeder for feeding said document and a second document, thereby facilitating said scanning apparatus to perform a duplex scanning operation or successively scan said document and said second document.

* * * * *